United States Patent [19]

Heidorn

[11] Patent Number: 4,865,565
[45] Date of Patent: Sep. 12, 1989

[54] SNEAK CURRENT PROTECTOR FOR A COMMUNICATION CIRCUIT 110-TYPE WIRING BLOCK

[75] Inventor: Richard Heidorn, Lombard, Ill.

[73] Assignee: Illinois Tool Works Inc., Chicago, Ill.

[21] Appl. No.: 243,279

[22] Filed: Sep. 12, 1988

[51] Int. Cl.[4] .............................................. H01R 33/95
[52] U.S. Cl. .................................... 439/622; 337/197
[58] Field of Search .............................. 439/622, 621; 337/187–189, 197, 213, 226, 263

[56] References Cited

U.S. PATENT DOCUMENTS 4,488,201 12/1984 Webb et al. ........................ 337/188

FOREIGN PATENT DOCUMENTS 540233 8/1955 Belgium ............................... 337/188
2707442 11/1977 Fed. Rep. of Germany ...... 439/621
2288413 2/1975 France ................................. 337/213

Primary Examiner—Gary F. Paumen
Attorney, Agent, or Firm—John P. O'Brien

[57] ABSTRACT

A sneak current protector for use with a communication circuit standard 110-type wiring block and block connector is disclosed. The protector includes a pair of fuses mounted between a first pair of resilient contact members and a second pair of stationary contact members. A female 110-type block connector attachment is provided at one end of the housing for attachment to the standard 110-type block connector and a complimentary shaped male attachment is provided at the opposite end of the housing for attachment to a patch cord-type terminal connector. Insulation displacement type contacts are provided at the male attachment for alternative connection to individual wires leading to the users equipment.

13 Claims, 2 Drawing Sheets

SNEAK CURRENT PROTECTOR FOR A COMMUNICATION CIRCUIT 110-TYPE WIRING BLOCK

BACKGROUND OF THE INVENTION

This invention relates to a protection device for a communication circuit. More particularly, invention relates to a sneak current protector for use with a communication circuit wiring block of the type commonly known as a 110-type wiring block.

Sneak current protectors are known and in particular are known for use with communication circuit wiring blocks of the type known as 66-M type wiring blocks. The standard 110 type wiring block to which the present invention relates is a high density type wiring block which utilizes a separate removable connector block which physically connects on top of the wiring block and electrically connects to incoming wires of the circuitry and wires leading to the user's equipment. The block connector can be connected to different desired incoming leads by moving the block connector to different locations on the wiring block. It would be highly desirable to provide for a sneak circuit protector which is mountable directly at the wiring block providing for an easily serviced device which protects both sides of a communication circuit lead. Until the present invention, no such device for the 110-type wiring block has been available.

SUMMARY OF THE INVENTION

Accordingly, the invention provides for an easily serviced sneak current protector for mounting directly on the connector block of a communication circuit utilizing a 110-type wiring block and block connector.

According to the invention, the protector includes two fuses in a housing each electrically connected in series between contacts which electrically connect to each side of a communication line.

According to an important aspect of the invention, one pair of contacts includes resilient contact portions for biasing the fuses into contact with a second pair of stationary contacts.

An important feature of the invention provides for the protector housing to comprise two halves, including means for laterally positioning the fuses in the cavity.

Another feature of the invention provides for the housing to include a female attachment at one end for attachment to the 110type block connector. Spade-type contact portions on the one pair of contacts are disposed in the female attachment for electrically connecting to the block connector terminals.

Another important feature provides for a male attachment at an end of the housing opposite the female attachment having a configuration complementary to the female attachment configuration. A combination insulation displacement and spade lug receiving-type contact portion is provided on the second pair of contacts disposed at the male attachment.

Advantageously, the male attachment and combination insulation displacement, spade lug receiving type contacts provide for alternative connection of a patch cord type terminal connector having spade type contacts or individual wire leads to the protection device.

BRIEF DESCRIPTION OF THE DRAWINGS

The invention will be better understood after reading the following Detail Description of the Preferred Embodiment in conjunction with the drawings in which.

DETAILED DESCRIPTION OF THE PREFERRED EMBODIMENT

Figure 1:
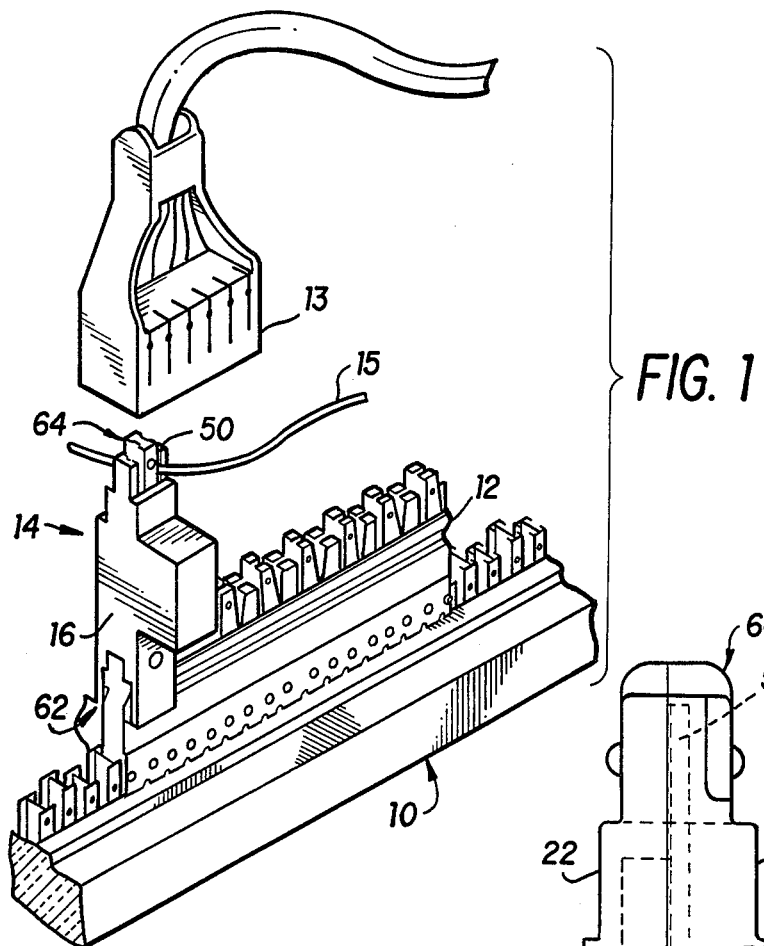
FIG. 1 is a perspective view of a portion of a communication circuit standard 110-type wiring block and block connector showing the sneak current protector according to the invention installed for alternative connection to individual circuit wires or a patch cord type terminal connector.
Figure 3:
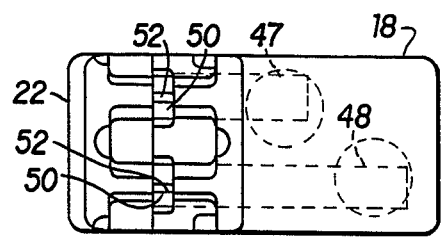
FIG. 3 is an end view of the protection device according to the invention showing details of construction.

Shown in FIG. 1 is a portion of a standard communication circuit 110-type wiring block 10. These wiring blocks function as a junction between external wiring and wires leading to the users equipment. A standard connector known as a 110-type block connector 12 physically connects to the wiring block and includes insulation displacement type terminals for electrically connecting to external wires at the wiring block. Heretofore, a patch cord 13 or individual user circuit wires were connected directly to installation displacement, spade lug receiving-type terminals at the top of the block connector 12. The wiring block 10 includes many connection points and multiple block connectors 12 are typically used. The details of the wiring block and block connector are well known and need not be described in further detail herein.

Removably attached to the top of the block connector 12 is a sneak current protector 14 according to the invention. The protector 14 comprises an electrically insulative housing 16 including a base 18 having a cavity 20 and a cover 22 glued or ultrasonically welded to the base. The cover is provided with projections 24, 26 extending from an inner surface into the cavity 20. These projections are in the form of a post or flange, and include a cut-out portion forming two shoulders 29,32, one shoulder 29 at the free end of each projection and the second shoulder 32 at the cut-out in each projection. The inner surface 31 of the base is also provided with a projection in a form of an elongated longitudinal ridge 34 located to one side of the cavity and laterally aligned with the second shoulder 32 of the projections 24,26.

Figure 4:
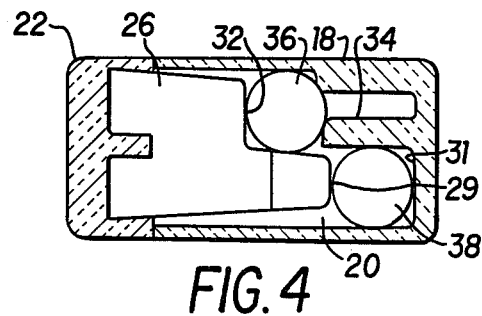
FIG. 4 is a transverse cross sectional view taken along the line 4—4 in FIG. 2 showing details of construction.
Figure 2:
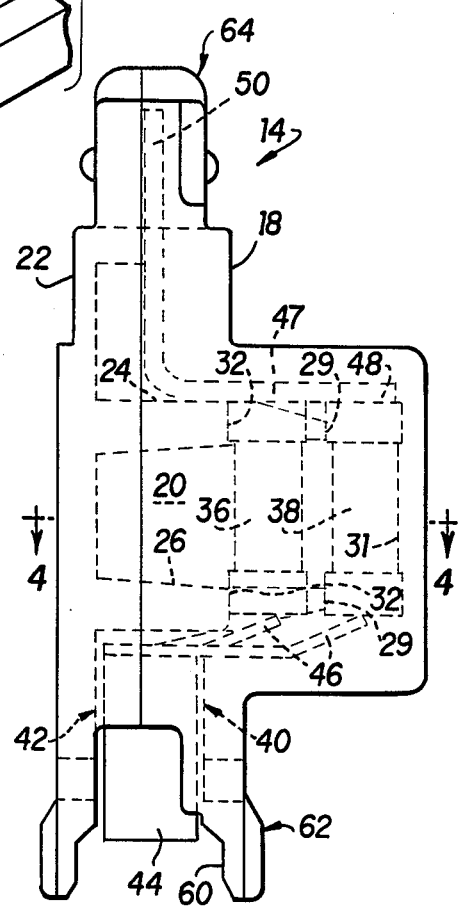
FIG. 2 is a side view of the assembled protection device.
Figure 5:
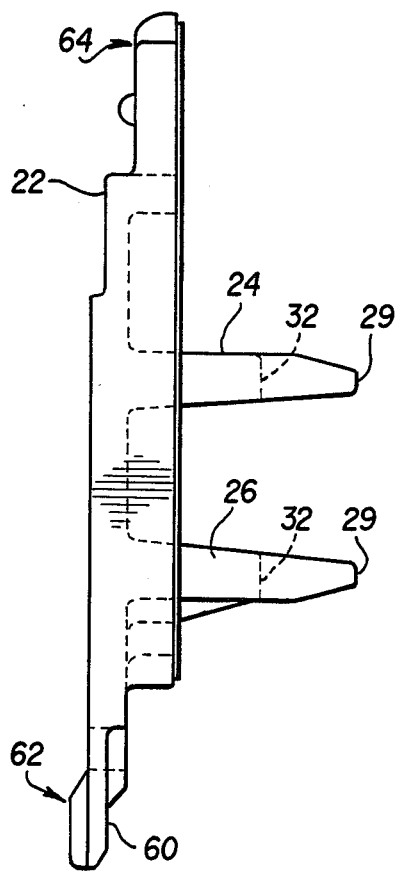
FIG. 5 is a side view of the cover portion of the protection device showing details of construction.
Figure 6:
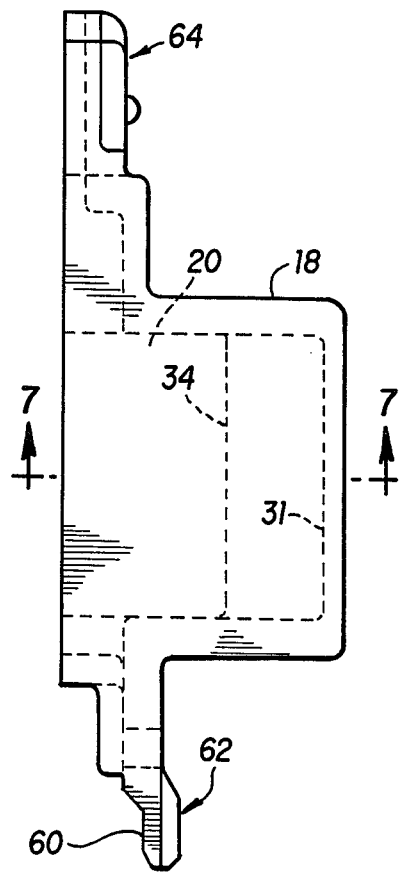
FIG. 6 is a side view of the base portion of the protection device showing details of construction.
Figure 7:
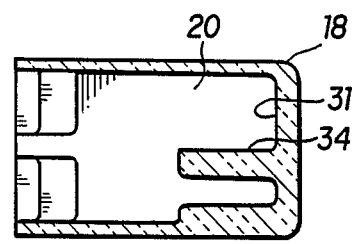
FIG. 7 is a transverse cross sectional view taken along the line 7—7 in FIG. 6.

Disposed in the cavity 20 are two fuses 36, 38. As shown in FIG. 4, one fuse 36 rests against the longitudinal ridge 34 and the shoulders 32 and the other fuse 38 is clamped between the inner surface 31 of the base and the free end 29 of each projection. As shown in FIGS. 2 and 4 the two fuses are positioned laterally offset from each other in the cavity 20 between the shoulders 29, 32 on the projections from the cover and the base inner surface 31 and ridge 34 respectively.

A first pair of L-shaped contact members 40, 42, are mounted in the housing at one end. Each contact member 40, 42 includes a spade-type contact portion 44 for receipt in the spade receiving contact provided in the standard 110-block connector 12 and a resilient contact portion in the form of an elongated leg having an angled or upturned free end 46. The resilient portion 46 of each of the first pair of contacts engages one end of each fuse 36, 38 and biases each fuse into electrical contact with each of a second pair of stationary contact members 47, 48 provided at the opposite end of the cavity 20.

The second pair of contact members 47, 48 are also each L-shaped members having a combination insulation displacement, spade lug receiving-type contact portion 50 which is typically a split member having a slit 52 that will slice the insulation on wires 15 to make electrical contact therewith or alternatively slideably received a spade-type lug similar to 44 provided in the patch cord terminal connector 13 in the slit 52. The second pair of contacts include the stationary contact portion 47, 48 retained between an upper surface on one of the projections, for example projection 24, and a surface of the housing to hold the contacts in position to be engaged by the end of each fuse. It is of course possible to alternatively provide the resilient contact portions on the second pair of contact members and the fixed contact portions on the first pair of contact members without deviating from the invention.

The spade-type contacts 44 on the first contact members 40, 42 are disposed in a female receptacle 60 of an attachment 62 provided on the housing 14 which attachment is configured for removable attachment to a standard 110-type block connector male attachment. The insulation displacement, spade lug receiving-type contact portions 50 of the second pair of contacts 47, 48 are each mounted in a male attachment 64 provided on the opposite end of the housing which has a configuration complimentary to the female receptacle configuration 60.

It can be seen that the sneak current protector according to the invention is removably attachable to a standard 110-type block connector and is adapted to alternatively have individual circuit wires connected to the insulation displacement-type contact or to a patch cord terminal connector so as to electrically connect one fuse serially into each side of a communication circuit connected to the wiring block.

Having described the preferred embodiment of the invention, those skilled in the art having the benefit of the description and the drawings can readily devise other embodiments and modifications and those other embodiments and modifications are to be considered to be within the scope of the appended claims.

What is claim is:

1. A sneak current protector for use with a communication circuit 110-type block connector, comprising:
   an electrically insulative housing including a cavity;
   a first pair of contacts mounted in said housing, each including a spade-type contact portion for connection to said block connector and a contact portion disposed in said cavity;
   a second pair of contacts mounted in said housing, each including a combination insulation displacement, spade receiving-type contact portion and a contact portion disposed in said cavity;
   a pair of fuses in said cavity, one fuse resiliently axially retained between the contact portion of one of the first pair of contacts and the contact portion of one of the second pair of contacts, at least one of said contact portions between which said first fuse is retained being resilient, and the second fuse resiliently axially retained between the contact portion of the other of said first pair of contacts and the contact portion of the other of said second pair of contacts, at least one of the contact portions between which said second fuse is retained being resilient.

2. The sneak current protector defined in claim 1 wherein said fuses in said cavity are between said respective resilient contact portions and the remaining said contact portions which are stationary.

3. The sneak current protector as defined in claim 2 further comprising means for laterally positioning said fuses which includes opposing stop means on said housing in said cavity engaging substantially opposite locations of each said fuse.

4. The sneak current protector as defined in claim 3 wherein said housing comprises a cover including at least one projection extending into said cavity, a base affixed to said cover including at least one additional projection extending into said cavity, said at least one projection engaging both of said pair of fuses and said at least one additional projection engaging at least one of said pair of fuses.

5. The sneak current protector as defined in claim 4 wherein the other of said pair of fuses is engaged against an inner surface of said base.

6. The sneak current protector as defined in claim 3 wherein each of said first pair of contacts is a generally L-shaped member wherein said resilient contact portion includes an angled portion at a free end of one leg of the member engaging an end of a respective one of said fuses.

7. The sneak current protector as defined in claim 6 wherein each of said second pair of contacts is a generally L-shaped member.

8. The sneak current protector as defined in claim 1 wherein said housing includes female attachment means at said spade-type contact portion of said first pair of contacts for removably attaching said housing to a standard 110-type communication block connector with said spade-type contact portions electrically connected to complimentary connections on said block connector and said housing further includes male attachment means at said second pair of contacts for removably attaching an electrical terminal connector to said housing, wherein said electrical terminal connector includes an attachment configuration substantially the same as the female attachment means for removably attaching located at said spade-type contact portion of said housing, said insulation displacement, spade receiving-type contact portion of said second pair of contacts is adapted to receive a spade-type contact in said electrical terminal connector.

9. A sneak current protector for use with a communication circuit 110-type block connector comprising:
   a housing including a base having a cavity and a cover attached to said base, said cover including means protruding into said cavity engaging a pair of fuses for laterally positioning said fuses in said cavity;
   said housing including a female attachment at one end for attachment to a communication circuit 110- type block connector male attachment and male attachment at an opposite end of said housing configured substantially complementary to that of the female attachment;

a first pair of contacts each including a spade-type contact portion in said female attachment and a resilient contact portion in said cavity, each said resilient contact portion engaged against one end of a different one of said fuses;

a second pair of contacts including an insulation displacement, spade receiving-type contact portion at said male attachment and a stationary contact portion engaged against an end of each said fuse opposite said one end, said resilient contact portions bias said fuses against said stationary contact portions of said second pair of contacts.

10. The sneak current protector as defined in claim 9 wherein said first pair of contacts are generally L-shaped members having two legs, one leg defining said spade-type contact portion, the second leg including an angularly disposed portion at its free end defining said resilient contact portion.

11. The sneak current protector as defined in claim 10 wherein said means protruding into said cavity for laterally positioning said fuses includes two spaced apart parallel post-like projections protruding perpendicularly from an inner surface of said cover, each said projection including a cut-out portion at its free end defining a shoulder, one fuse engaged by said free end, the second fuse engaged by said shoulder.

12. The sneak current protector as defined in claim 11 further including a projection on the inner surface of said base engaging said second fuse at a location opposite said shoulder on said projections of said cover, whereby said second fuse is laterally offset in said cavity from said first fuse.

13. A sneak current protector for use with a communication circuit 110-type block connector comprising:

a housing including a cavity;

two fuses mounted in a parallel in said cavity;

a first pair of contacts in said housing, each including a male portion of a spade-type contact and a resilient contact portion engaging each said fuse;

a second pair of stationary contacts in said housing, each including a combination insulation displacement, spade-receiving contact portion, each said stationary contact engaging one said fuse, each being biased into contact with a said stationary contact said housing including a 110-type block connector female attachment, said male portions of said spade-type contacts of said first pair of contacts member located in said female attachment, and a male attachment having therein said combination insulation displacement, spade-receiving contact portions of said second pair of contacts, said male attachment being complimentary in shape to said female attachment

* * * * *